July 4, 1967  R. E. WADE  3,329,283
FOLDABLE SNAP MOUNT SIDE BOOM FOR TRACTORS
Filed March 25, 1966  2 Sheets-Sheet 1

INVENTOR.
RAYMOND E. WADE
BY
Head & Johnson
ATTORNEYS

July 4, 1967    R. E. WADE    3,329,283
FOLDABLE SNAP MOUNT SIDE BOOM FOR TRACTORS
Filed March 25, 1966    2 Sheets-Sheet 2

INVENTOR.
RAYMOND E. WADE
BY
*Head & Johnson*
ATTORNEYS

United States Patent Office 3,329,283
Patented July 4, 1967

3,329,283
FOLDABLE SNAP MOUNT SIDE BOOM
FOR TRACTORS
Raymond E. Wade, Tulsa, Okla., assignor to Midwestern
Manufacturing Company, Tulsa, Okla., a corporation of
Oklahoma
Filed Mar. 25, 1966, Ser. No. 537,485
5 Claims. (Cl. 212—8)

This invention relates to a foldable snap mount side boom for tractors. More particularly, the invention relates to a foldable snap mount side boom for tractors characterized by providing arrangement wherein the boom, when not in use, can be folded to reduce the overhead clearance height required.

Tractors having side booms have been utilized for many years in industry. United States Patent 3,055,511, issued on Sept. 25, 1962, to J. C. Sharp for a composite side boom teaches an arrangement wherein substantially all of the structures, including winches, pulleys, cables and so forth are integrally contained in a composite arrangement readily adapted for quick mounting or demounting from a tractor. The boom taught in this patent is completely successful in every way except that it has a rather high overhead clearance requirement which in some instances is a detriment when the tractor is being moved from one place to another. To concentrate the center of gravity towards the center of the tractor the boom must be raised, during transportation, to substantially the vertical position. That is, the boom must be raised to as close to the tractor as possible and it is in this position that the maximum overall height is presented. If the boom is lowered at an angle to reduce the height, the width requirements become excessive.

It is therefore an object of this invention to provide a snap mount side boom for a tractor having greatly reduced height clearance requirements.

Another and more specific object of the invention is to provide a snap mount side boom for tractors including a folding arrangement wherein the boom may be folded to reduce the height in half when the boom is not in use.

Another specific object of this invention is to provide a foldable snap mount side boom for a tractor including means whereby the integral hooks and cable equipment of the side boom can be utilized to rigidly secure the boom to the side of the tractor to which it is attached when the side boom is not being used.

These and other objects and a better understanding of the invention may be had by referring to the following description and claims taken in conjunction with the attached drawings in which:

Figure 1:
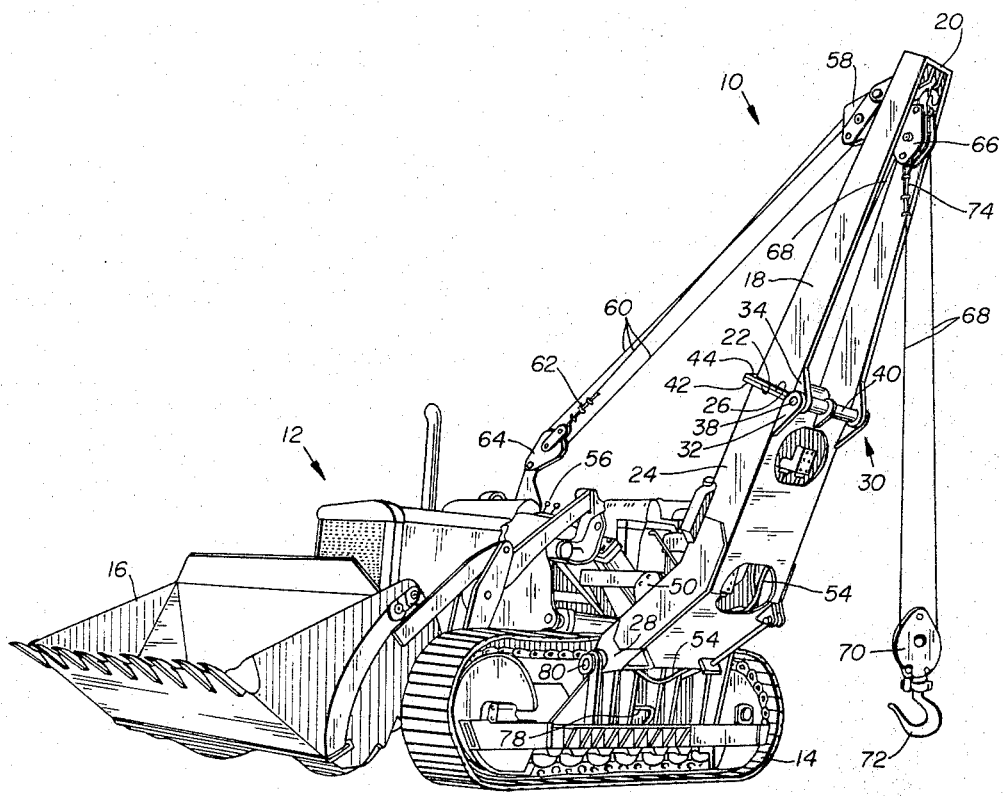
FIGURE 1 is an isometric view of a tractor having a foldable snap mount side boom of this invention affixed thereto, the boom being shown in working position.

Referring now to the drawings and first to FIGURE 1, the foldable snap mount side boom of this invention is indicated generally by the numeral 10 and is shown affixed to a crawler type tractor 12. The tractor is illustrated as the type utilizing tracks 14, it being understood that the side boom of this invention may be equally well adapted to any type tractor, including rubber tire tractors and other such similar vehicles.

As shown in FIGURE 1, the tractor 12 is equipped with a front end loader 16 illustrating that the side boom 10 may be utilized on a tractor 12 having a multiplicity of purposes. As an example, when the tractor 12 is being utilized to operate the front end loader 16, the boom 10 of the invention can be folded in a reduced height manner and secured to the tractor.

The boom 10 is bifurcated. One-half is an outer portion 18 having an outer end 20 and an inner end 22. The second portion of the bifurcated boom 10 is an inner portion 24 having an outer end 26 and an inner end 28. A hinge 30 is affixed to the outer end 26 of the inner portion 24 and the inner end 20 of outer portion 18. The hinge 30 pivotally supports the boom portions 18 and 24 together and permits their pivotation through approximately 180° in a plane of the portions 18 and 24.

Figure 3:
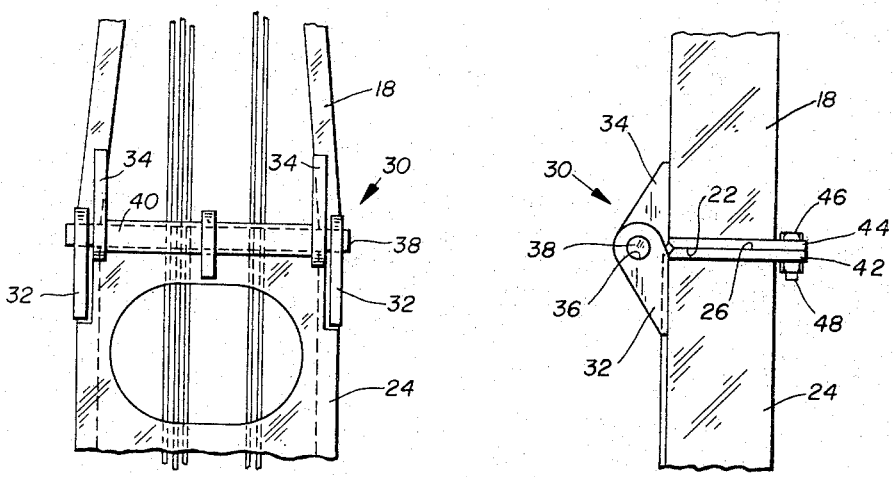
FIGURE 3 is a segmented plan view of the middle portion of the side boom of this invention showing the hinge arrangement.
Figure 4:
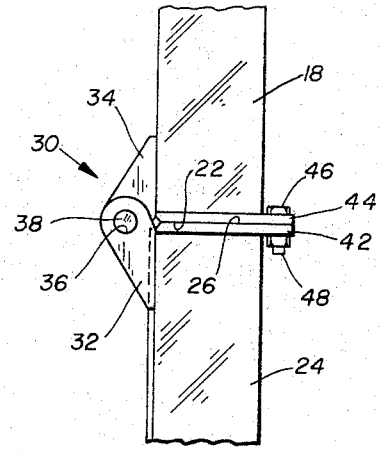
FIGURE 4 is a segmented view as shown in FIGURE 3 showing the hinge arrangement in side view.

As shown in FIGURES 3 and 4, the hinge 30 may typically consist of spaced parallel planar flange portions 32 affixed to the boom inner portion 24 and similar spaced flange portions 34 affixed to the outer boom portion 18. The flange portions 32 and 34 are parallel to and adjacent each other and each has an opening 36 therein receiving a hinge pin 38. A tubular reinforcing member 40 receiving the hinge pin 38 is positioned between the flange portions 34 and secured to them to provide increased lateral stability.

An abutting hinge plate 42 is affixed to the outer end 26 of the inner boom portion 24 perpendicular the longitudinal axis of the boom portion and similarly an abutting hinge plate 44 is affixed to the inner end 22 of outer boom portion 18, the hinge plates 42 and 44 being parallel and contiguous to each other when the bom is in working positions, as shown in FIGURES 1, 3 and 4. To secure the boom in working position a bolt 46 (see FIGURE 4) extends through openings in the plates 42 and 44 and is secured by a nut 48.

Referring again to FIGURES 1 and 2, a boom winch 50 is supported to the boom inner portion 24 and spaced therefrom is a load winch 52. The winches 50 and 52 are preferably hydraulically powered winches which function from controlled hydraulic fluids supplied by the tractor 12 in the customary manner so that the boom and load winches 50 and 52 may be controlled to rotate in either direction. The winches 50 and 52 are hydraulically connected to the tractor by hydraulic hoses 54, the winches being actuated by controls 56.

Adjacent the outer end 20 of the boom outer portion 18 is a boom pulley 58. A boom cable 60 has one end wound on the boom winch 50 and extends from the boom winch over the boom pulley 58 and back to the tractor 12. The free end 62 of the boom cable 60 is affixed to the tractor. In the preferred embodiment shown the boom pulley 58 is a double pulley and there is provided a tractor pulley 64 mounted on the tractor. In this arrangement the boom cable 60 extends from the boom winch 50 over the boom pulley 58, over the tractor pulley 64, again over boom pulley 58 and back to the tractor pulley 64 wherein the free end 62 is affixed. This arrangement gives an obvious mechanical advantage in the operation of the boom. It can be seen that by rotation of the boom winch 50 the length of boom cable 60 may be varied so that the angular relationship between the boom and the tractor is controlled.

Adjacent the outer end 20 of the outer boom portion 18 is a load pulley 66. A load cable 68 extends from the load winch 52 and over the load pulley 66 whereby the free end thereof is adaptable to connect to a load to be lifted by the boom. In the preferred embodiment illustrated, a work pulley 70 is provided having a hook 72 thereon. In this arrangement the load cable 68 extends from the load winch 52, over the load pulley 66, under work pulley 70 and back having the free end 74 thereof affixed to the load pulley 66. In this manner the load winch 52 may be rotated to wind load cable 68 thereon and thereby lift the work pulley 70 and hook 72 to lift any load attached thereto. Reversing the direction of rotation of the load winch 52 permits downward movement of the work pulley 70 and hook 72.

The pulley arrangements illustrated are merely exemplary and it can be seen that various other pulley arrangements may be made to increase or decrease the mechanical advantage desired.

Figure 2:
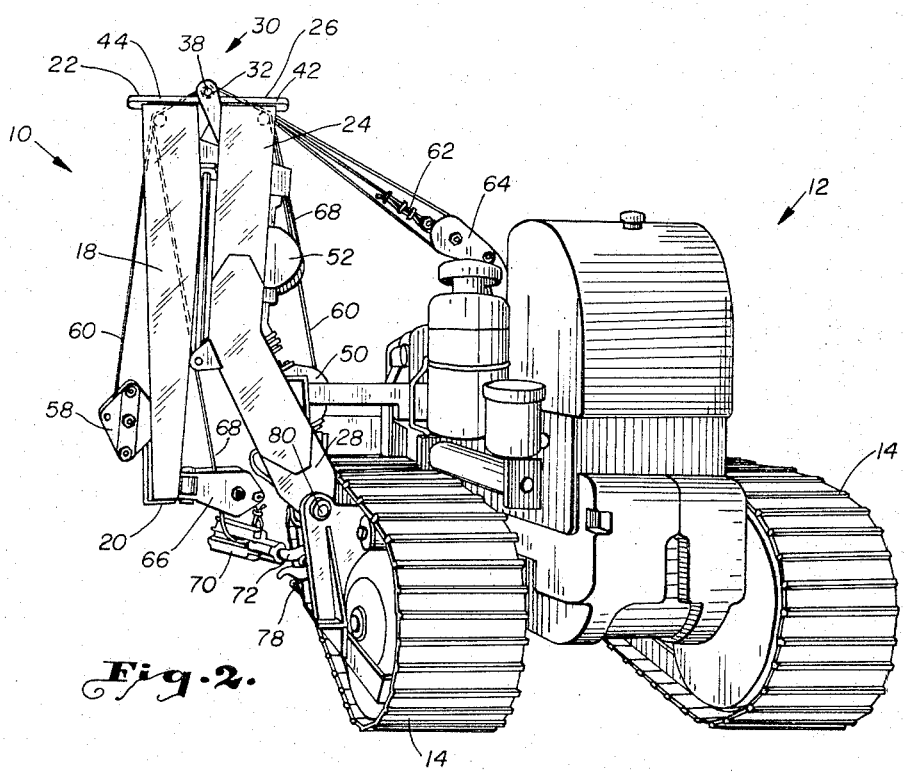
FIGURE 2 is an isometric view of the rear of the tractor of FIGURE 1 showing the foldable snap mount side boom of this invention in folded and secured position.

As shown in FIGURE 1, a hook receiving means 78 is affixed to the tractor 12 below the hinge point 80 at which the lower portion 58 of the pulley boom is attached to the tractor. When the boom 10 is in folded position, as shown in FIGURE 2, hook 72 may be attached to the hook receiving members 78. Load winch 52 may then be rotated to retract the load cable 68 and thereby pull the outer boom portion 18 in fixed contiguous relationship to the inner boom portion 24. In like manner the boom pulley 58 can be retracted applying tension on the boom cable 60 so that the folded boom is firmly supported in an upright position. In this way the boom is in effectively self-storing position, that is, it includes the components necessary to insure that it is securely held in all of its elements to the tractor when in folded position to permit free use of the tractor during movement from one location to another or for the use of auxiliary equipment such as front end loader 16 shown in FIGURE 1.

This invention provides a unique snap mounted side boom which can be quickly and easily connected to or disengaged from a tractor and further includes the important provision of means of folding the boom into compact integral self-storing position to more effectively adapt the tractor for other uses.

While the invention has been described with a certain degree of particularity, it is manifest that many changes may be made in the details of construction and the arrangement of components without departing from the spirit and scope of this disclosure.

What is claimed:
1. A foldable snap mount side boom for a tractor comprising
   a bifurcated boom having an outer portion and an inner portion, the inner end of said inner portion hingedly supported at a point on one side of said tractor;
   a hinge affixed to the outer end of said inner portion and the inner end of said outer portion of said boom hingedly supporting said portions together whereby in one position said portions are aligned to provide an elongated boom pivotally extending from said tractor and in another position said portions are parallel to each other in overhead clearance height reduced folded relationship;
   a boom winch supported on said boom inner portion;
   a boom pulley rotatably supported on the outer end of said boom outer portion;
   a boom cable windably supported on said boom winch and extending from said boom winch over said boom pulley and to said tractor, the free end of said boom cable affixed to said tractor;
   a load winch supported on said boom inner portion;
   a load pulley rotatably supported on the outer end of said boom outer portion adjacent said boom pulley; and
   a load cable windably supported on said load winch and extending from said winch over said load pulley, the free end thereof adaptable to connect to a load.

2. A foldable composite side boom for a tractor according to claim 1 wherein said boom pulley is a double pulley and including a tractor pulley affixed to said tractor at a point above the point the inner end of said inner boom portion is hingedly supported to said tractor, and wherein said boom cable extends from said boom winch over one of said boom pulleys, over said tractor pulley, over the other of said boom pulleys, the free end of said boom cable being affixed to said tractor.

3. A foldable composite side boom for a tractor according to claim 1 including a hook receiving member affixed to said tractor below the point said boom inner portion is hingedly supported on said tractor; and a work hook affixed to the free end of said load cable, said hook engageable with said hook receiving member when said boom inner and outer portions are in folded relationship whereby said load cable may be wound onto said load winch to firmly support said boom on said tractor.

4. A foldable composite side boom for a tractor according to claim 1 including a work pulley having means adapted to connect to a load, and wherein said load cable extends from said load winch, over said load pulley, under said work pulley, the free end of said load cable being affixed to the outer end of said boom outer portion.

5. A foldable composite side boom for a tractor according to claim 4 wherein said means adapted to connect said work pulley to a load including a work hook affixed to said work pulley and including a hook receiving member affixed to said tractor below the point said boom inner portion is hingedly supported on said tractor, said hook engageable with said hook receiving member whereby when said boom inner and outer ends are in folded relationship said load cable may be wound on said load to firmly support said boom to said tractor.

References Cited
UNITED STATES PATENTS 2,336,965   12/1943   Shoemaker _____ 212—8
3,055,511    9/1962   Sharp _____ 212—8

ANDRES H. NIELSEN, *Primary Examiner.*